(12) United States Patent
Dahn et al.

(10) Patent No.: US 8,586,240 B2
(45) Date of Patent: *Nov. 19, 2013

(54) METHOD OF MAKING TIN-BASED ALLOYS FOR NEGATIVE ELECTRODE COMPOSITIONS

(75) Inventors: Jeffrey R. Dahn, Nova Scotia (CA); Pierre P. Ferguson, New Brunswick (CA); Mark N. Obrovac, St. Paul, MN (US); Dinh B. Le, St. Paul, MN (US); James R. Landucci, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,402

(22) Filed: Jul. 27, 2012

(65) Prior Publication Data

US 2012/0301782 A1      Nov. 29, 2012

Related U.S. Application Data

(63) Continuation of application No. 12/493,285, filed on Jun. 29, 2009, now Pat. No. 8,257,864.

(51) Int. Cl.
| | |
|---|---|
| *H01M 4/13* | (2010.01) |
| *H01M 4/58* | (2010.01) |
| *H01M 4/88* | (2006.01) |
| *H01B 1/02* | (2006.01) |

(52) U.S. Cl.
USPC .............. 429/218.1; 429/221; 429/231.8; 252/520.1; 252/182.1

(58) Field of Classification Search
USPC ........... 429/221, 231.8, 218.1, 485, 487, 527; 252/182.1, 520.1, 512, 513, 521.2; 427/77; 420/129

See application file for complete search history.

(56) References Cited

U.S. PATENT DOCUMENTS

| | | | | |
|---|---|---|---|---|
| 4,627,959 | A | * | 12/1986 | Gilman et al. .................. 419/61 |
| 6,495,291 | B1 | * | 12/2002 | Kohno et al. .............. 429/231.8 |
| 7,169,328 | B2 | | 1/2007 | Miller et al. |
| 8,287,772 | B2 | | 10/2012 | Le et al. |
| 2005/0031957 | A1 | | 2/2005 | Christensen et al. |
| 2006/0046144 | A1 | | 3/2006 | Obrovac |
| 2006/0068292 | A1 | | 3/2006 | Mizutani et al. |

(Continued)

FOREIGN PATENT DOCUMENTS

| | | |
|---|---|---|
| JP | 2000-119708 | 4/2000 |
| JP | 2000-311681 | 11/2000 |

(Continued)

OTHER PUBLICATIONS

J. R. Dahn, R. E. Mar, A. Abouzeid. Combinatorial Study of Sn1-xCox (0 < x < 0.6 and [Sn0.55Co0.45]1-yCy(0 < y _ 0.5 < 0.5) Alloy Negative Electrode Materials for Li-Ion Batteries, J. Electrochem. Soc. 2006, 153(2), A361-365.*

(Continued)

*Primary Examiner* — Carlos Barcena
(74) *Attorney, Agent, or Firm* — Adam Bramwell (57) ABSTRACT

Powder milling techniques, tin-based alloys formed thereby, and the use of such alloys as electrode compositions for lithium ion batteries are provided. The alloys include tin and at least one transition metal but contain no silicon. The powder milling is done using low energy roller milling (pebble milling).

11 Claims, 5 Drawing Sheets

(56) References Cited

U.S. PATENT DOCUMENTS

| | | | |
|---|---|---|---|
| 2007/0020521 A1 | 1/2007 | Obrovac et al. | |
| 2007/0020522 A1 | 1/2007 | Obrovac et al. | |
| 2007/0020528 A1 | 1/2007 | Obrovac et al. | |
| 2007/0128517 A1 | 6/2007 | Christensen et al. | |
| 2007/0148544 A1 | 6/2007 | Le | |
| 2008/0206641 A1 | 8/2008 | Christensen et al. | |
| 2008/0248386 A1 | 10/2008 | Obrovac et al. | |
| 2009/0111022 A1 | 4/2009 | Dahn et al. | |
| 2010/0189995 A1 | 7/2010 | Adams et al. | |
| 2010/0288077 A1 | 11/2010 | Le | |
| 2010/0288982 A1 * | 11/2010 | Le et al. | 252/513 |

FOREIGN PATENT DOCUMENTS

| | | |
|---|---|---|
| JP | 2001-118575 | 4/2001 |
| JP | 2004-071391 | 3/2004 |
| JP | 2005-078999 | 3/2005 |

OTHER PUBLICATIONS

J Hassoun, G. Mulas, S. Panero, B. Scrosati. Ternary Sn—Co—C Li-ion battery electrode material prepared by high energy ball milling, Electrochem. Comm. 2007, 9, 2075-2081.*

J. Hassoun, S. Panero, G. Mulas, B. Scrosati. An electrochemical investigation of a Sn—Co—C ternary alloy as a negative electrode in Li-ion batteries, J. Power Sources 2007, 171, 928-931.*

O. Mao, R. A. Dunlap, J. R. Dahn. Mechanically Alloyed Sn—Fe(-C) Powders as Anode Materials for Li-Ion Batteries, J. Electrochem. Soc. 1999, 146(2), 405-413.*

Ou Mao et al., Mechanically Alloyed Sn—Fe(-C) Powders As Anode Materials for Li-Ion Batteries, *J. Electrochem. Soc.*, 146 (2), pp. 405-413 (1999).

P. P. Ferguson et al., Study of $Sn_{30"}Co_{1\pm x}Fe_{x-.30}C_{40}$ Alloy Negative Electrode Materials Prepared by Mechanical Attriting, *J. Electrochem. Soc.*, 156, A13 (2009).

Hassoun et al, An Electrochemical Investigation of a Sn—Co—C Ternary Alloy As a Negative Electrode in Li-Ion Batteries, *Journal of Power Sources*, 171 (2), pp. 928-931, Sep. 27, 2007.

PCT International Search Report for PCT/US2010/039124, dated Feb. 8, 2011.

J. Hassoun, G. Mules, S. Panero, B. Scrosati, Ternary Sn—Co—C Li-ion battery electrode material prepared by high energy ball milling, Electrochem. Comm. 2007, 9, 2075-2081.

* cited by examiner

METHOD OF MAKING TIN-BASED ALLOYS FOR NEGATIVE ELECTRODE COMPOSITIONS

CROSS-REFERENCE TO RELATED APPLICATIONS

This application is a continuation of U.S. application Ser. No. 12/493,285, filed Jun. 20, 2009, issued as U.S. Pat. No. 8,257,864, the disclosure of which is incorporated by reference in their entirety herein.

FIELD

Powder milling techniques, tin-based alloys formed thereby, and the use of such alloys as electrode compositions for lithium ion batteries are provided.

BACKGROUND

A pebble mill is a type of ball mill characterized by a cylindrical or conical vessel rotated on a horizontal axis. Pebble mills can have steel inner walls, but often are lined with ceramic, rubber, plastic or other materials. Pebble mills are used in conjunction with milling media that are typically steel or ceramic, although other milling media can be used.

Pebble mills can be in the form of cylindrical jars which are loaded from a sealable port on one end of the jar. During the milling process, smaller pebble mills are often placed on a powered set of rollers. Larger pebble mills often consist of a cylindrical vessel, mounted horizontally on pins along its longitudinal axis and driven by a shaft, gears, or belts. Such pebble mills commonly further comprise a fixed shroud which encloses the milling vessel. The shroud allows for discharging of the mill while the vessel is being rotated. Pebble mill vessels sometimes have double walls to allow for water cooling of the milling vessel, lifters to prevent the slippage of the media on the interior walls of the vessel, and/or ports to allow gas purging during operation.

Pebble mills are commonly used to grind powders to fine particle sizes or to disperse powders or pigments in solvents. In conventional dry grinding operations pebble mills are typically filled to half of their volume with a mixture of the milling media and the powder to be ground (commonly termed as the millbase). The milling media is commonly of three types: spherical, cylindrical or irregular. In the case of spherical milling media, the volume ratio of the milling media to the millbase is typically 30:20. The rotational speed of the vessel is set so that the media inside the vessel form a continuous cascade, with the cascade angle being in a range of 45-60° with respect to horizontal. These conditions are widely used as they are optimal for the efficient milling of powders. At higher rotational speeds the media tend to be launched into the air inside the vessel. At even higher rotational speeds the media can become pinned to the sides of the vessel by centrifugal force. The theoretical rotational speed in revolutions per minute (rpm) at which the media becomes pinned to the vessel's side is called the critical speed of the mill and is given by:

$$\text{rpm}_{critical} = 54.2/R^{0.5}$$

where R is the inside diameter of the milling vessel expressed in feet.

SUMMARY

Because of the low melting point of tin, it is generally more difficult to make nanostructured tin-based alloys than silicon-based alloys. Although tin-based alloy compositions useful in negative electrodes in lithium-ion electrochemical cells are known, they are somewhat difficult to process and relatively expensive. What is needed is an economical method to make nanostructured tin-based alloy useful as negative electrode materials.

In one aspect, what is provided is a method of making nanostructured alloy particles containing substantially no silicon, the method comprising: milling a millbase in a pebble mill containing milling media to provide the nanostructured alloy particles, wherein the millbase comprises tin, and at least one of carbon or a transition metal, and wherein the nanostructured alloy particles are substantially free of crystalline domains greater than 50 nanometers in size.

In another aspect, what is provided is a method of making a negative electrode composition for a lithium-ion electrochemical cell that includes milling a millbase in a pebble mill wherein the millbase includes tin and at least one of carbon or a transition metal, wherein the nanostructured alloy particles are substantially free of crystalline domains greater than 500 nanometers in size, and dispersing the nanostructured alloy particles in a slurry that includes a polymeric binder, and coating the slurry onto a metal current collector to provide the negative electrode.

In some embodiments, a volume ratio of the milling media to the millbase is greater than 1.5:1. In some embodiments, a volume ratio of the milling media to the millbase is greater than 5:1. In some embodiments, the nanostructured alloy particles are amorphous. In some embodiments, a volume ratio of the pebble mill to the milling media and the millbase combined is 2:1 or less. In some embodiments, the pebble mill has a theoretical critical speed, and wherein the pebble mill has a rotational speed in a range of from 50 to 140 percent of the theoretical critical speed. In some embodiments, the pebble mill has a maximum impact energy in a range of from 0.01 to 0.3 joules. In some embodiments, the pebble mill has a containment wall having a temperature, wherein the temperature is maintained at or below 100° C. In some embodiments, the pebble mill has a steel inner wall. In some embodiments, the pebble mill has a ceramic or ceramic-lined containment wall.

In some embodiments, the nanostructured alloy particles comprise tin, carbon, and a transition metal. In some embodiments, the millbase comprises iron, cobalt or a combination thereof. In some embodiments, the pebble mill further contains a milling aid comprising a saturated higher fatty acid or a salt thereof. In some embodiments, the milling aid comprises stearic acid. In some embodiments, the nanostructured alloy particles are adapted for use as an active material in a negative electrode composition in a lithium ion battery. In some embodiments, the nanostructured alloy particles comprise at least 10, 20, 30, 40, 50, 60, or even 70 percent by weight of tin, or more. They contain substantially no silicon.

As used herein:

the term alloy refers to a substance having one or more metallic phases, and comprising two or more metallic elements;

the term metallic compound refers to a compound that includes at least one metallic element;

the term alloying refers to a process that forms an alloy;

the term amorphous as applied to a material means that the material lacks the long range atomic order characteristic of crystalline material, as observed by x-ray diffraction;

the term delithiation refers to a process for removing lithium from an electrode material;

the term electrochemically active refers to a material that reversibly reacts with lithium under conditions typically encountered during charging and discharging in a lithium-ion battery;

the term metallic element refers to all elemental metals (including tin), silicon, and carbon;

the term mill refers to a device for alloying, grinding, milling, pulverizing, or otherwise breaking down a material into small particles (examples include pebble mills, jet mills, ball mills, rod mills and attritor mills);

the term milling refers to a process of placing a material in a mill and operating the mill to perform alloying, or to grind, pulverize, or break down the material into small or smaller particles;

the term nanostructured alloy refers to an alloy that is substantially free of crystalline domains greater than 50 nanometers in size;

the term amorphous alloy refers to a nanostructured alloy that lacks long range order in the positions of its atoms;

the term negative electrode refers to an electrode of a lithium ion battery (often called an anode) where electrochemical oxidation and delithiation occurs during a discharging process;

the phrase positive electrode refers to an electrode (often called a cathode) where electrochemical reduction and lithiation occurs during a discharging process; and the phrase substantially no silicon refers to compositions that have essentially no silicon, however, they may contain small amounts of silicon impurities in an amount of less than 1% by weight.

Advantageously, milling methods are provided that produce nanostructured alloy particles that are substantially free of crystalline regions having a size in excess of 50 nanometers. For example, the nanostructured alloy particles may have less than 1 percent by weight, less than 0.5 weight percent (wt %), or even less than 0.1 wt % of crystalline regions having a size in excess of 50 nanometers.

Moreover, the milling methods are readily scalable to commercial production levels. In contrast, currently used technologies (e.g., high impact mills) are prone to formation of larger crystalline regions and/or are problematic to scale up to produce commercially useful quantities of nanostructured alloy particles. For use in negative electrodes of lithium ion batteries, the nanostructured alloy particles should be amorphous or at least be substantially free of crystalline regions having a size in excess of 50 nanometers as materials having such regions are generally not suitable for repeated lithiation/delithiation.

The above summary is not intended to describe each disclosed embodiment of every implementation of the present invention. The brief description of the drawing and the detailed description which follows more particularly exemplify illustrative embodiments.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term about. Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Pebble mills are well known in the powder processing art. They are widely available commercially from a multitude of manufacturers. Whether generally cylindrical, generally conical, or some other shape, useful pebble mills may be relatively small (e.g., having a maximum inside diameter of 6 inches (15 cm) or less) or they may have a maximum larger inner diameter (e.g., up to 6 feet (2 m) or more); making them useful for commercial-scale production. The pebble mills can, for example, have steel walls or be lined with ceramic material. As is common in the art, the pebble mill may be of the double wall type, wherein a cooling medium (e.g., water) can be circulated between the walls, thereby regulating the temperature of the inner wall. For example, the temperature of the inner (containment) wall may be maintained at or below 100° C.

In normal operation, pebble mills typically have a theoretical critical speed at which milling media contained in the pebble mill are theoretically pinned against the wall by centrifugal force and milling efficiency declines markedly. However, in at least some cases it has been unexpectedly found that milling speeds near or above the theoretical critical speed can result in nanostructured alloys. While experimental condition will vary somewhat depending on the pebble mill design, it is found that rotational speeds in a range of from 50 to 140 percent of the critical speed are typically suitable for producing nanostructured alloy particles that are amorphous or at least substantially free of crystalline domains greater than 50 nanometers in size. Under these conditions, the maximum impact energy of the milling media contained in the pebble mill is typically insufficient to induce significant crystallization of the nanostructured alloy particles.

Useful milling media are readily available from commercial sources and include stainless steel, glass, and ceramic media, however other milling media may also be used. The milling media may have the form of balls, rods, irregular shaped bodies, and combinations thereof. Examples of milling media include chrome steel balls, ceramic balls, ceramic cylinders, long steel bars, short steel bars, and combinations thereof.

In some embodiments, the millbase includes multiple types of particles having different compositions. For example, the millbase may include tin particles, carbon particles, and transition metal particles. In some embodiments, the millbase comprises one or more alloys of the tin particles, carbon particles, and/or transition metal particles. Examples of alloys include alloys of one or more of transition metals (including rare earth metals) such as, e.g., Fe, Ti, Y, V, Cu, Zr, Zn, Co, Mn, Mo, and Ni; for example, Misch metal (mixture of rare earths). Whatever the composition of the millbase, if intending to use the nanostructured alloy particles in a negative electrode composition in a lithium ion battery, the proportions should generally be adjusted such that the resultant negative electrode composition is electrochemically active, as is well known in the battery art.

The millbase may further comprise a milling aid. Examples of milling aids include one or more saturated higher fatty acids (e.g., stearic acid, lauric acid, and palmitic acid) and salts thereof; hydrocarbons such as mineral oil, dodecane, polyethylene powder. In general the amount of any optional milling aid is less than 5 percent by weight, typically less than 1 percent by weight of the millbase.

If desired, solid millbase ingredients may be obtained as powder or reduced to a powder from ingot or chunks prior to placing them in the pebble mill. In some cases, ingot or chunk may be used directly in the pebble mill, in which case the ingots or chunks are broken up during the milling process. Pure elements may be used as components of the millbase, or one or more of them may be substituted by preformed alloys; for example, as generally described in U.S. application Ser. No. 12/465,865 (Le), and Ser. No. 12/465,852 (Le et al.) both filed May 14, 2009.

Any relative amount of the millbase and milling media may be used, but typically a volume ratio of the milling media to the millbase of greater than 1.5:1, or even greater than 5:1, provides for relatively high productivity and quality. Any volume ratio of the enclosed volume of the pebble mill to the milling media and the millbase may be used. Typically, nanostructured alloy particles that are substantially free of crystalline regions having a size in excess of 50 nanometers are obtained when the enclosed volume of the pebble mill divided by the milling media and the millbase combined is in a range of 2:1 or less. In general, milling should be conducted in a controlled oxygen environment; for example, in an inert gas (e.g., nitrogen, helium, and/or argon) environment. milling a millbase in a pebble mill containing milling media to provide the nanostructured alloy particles, wherein the millbase comprises: tin, and at least one of carbon or a transition metal, and wherein the nanostructured alloy particles are substantially free of crystalline domains greater than 50 nanometers in size, wherein the pebble mill comprises a cylindrical or conical vessel rotated on a horizontal axis.

Exemplary nanostructured alloys include tin alloys that include from about 30 wt % to about 70 wt % tin and cobalt and about 10 wt % to about 30 wt % carbon. Exemplary tin alloys can also contain iron. Examples of useful tin alloys are disclosed, for example, in U. S. Pat. Publ. Nos. 2006/0068292 (Mizutani et al.), 2007/0020528 (Obrovac et al.) and 2009/0111022 (Dahn et al.).

Nanostructured alloy particles prepared according to the provided methods can be dispersed in a polymeric binder to form a negative electrode composition and/or a positive electrode composition using techniques well known in the battery art. Exemplary polymeric binders include oxo-acids and their salts, such as sodium carboxymethylcellulose, polyacrylic acid and lithium polyacrylate. Other examples of polymeric binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Other polymeric binders include polyimides such as the aromatic, aliphatic or cycloaliphatic polyimides and polyacrylates. The polymeric binder may be crosslinked. Crosslinking can improve the mechanical properties of the binders and can improve the contact between the active material composition and any electrically conductive diluent that can be present.

Electrode compositions can contain additives such as will be familiar to those skilled in the art. For example, the electrode composition can include an electrically conductive diluent to facilitate electron transfer from the powdered material to a current collector. Electrically conductive diluents include, but are not limited to, carbon (e.g., carbon black for negative electrodes and carbon black, flake graphite and the like for positive electrodes), metal, metal nitrides, metal carbides, metal suicides, and metal borides. Representative electrically conductive carbon diluents include carbon blacks such as Super P and Super S carbon blacks (both from MMM Carbon, Belgium), Shawnigan Black (Chevron Chemical Co., Houston, Tex.), acetylene black, furnace black, lamp black, graphite, carbon fibers and combinations thereof.

Useful electrode compositions can also include graphite acting as an active material. Graphites are active negative electrode materials and are furthermore useful in decreasing the porosity of the electrode during the calendaring process. Examples of useful graphites are MAG-E (Hitachi Chemical Co. Ltd., Tokyo, Japan) and SLP30 and SFG-44 (both from TIMCAL Ltd., Bodio, Switzerland). Other additives that can be useful in the provided electrode compositions can include an adhesion promoter that promotes adhesion of the powdered material or electrically conductive diluent to the binder or a surfactant that can promote dispersion of the electrode ingredients in a coating solvent.

To make a negative electrode, the negative electrode composition, optionally containing coating viscosity modifiers such as carboxymethylcellulose and other additives known by those skilled in the art, is mixed in a suitable coating solvent such as water, ethanol, methanol, isopropanol, n-propanol or N-methylpyrrolidinone to form a coating dispersion or coating mixture. The dispersion is mixed thoroughly and then applied to the metal foil current collector by any appropriate dispersion coating technique (e.g., knife coating, notched bar coating, slot-die coating, dip coating, spray coating, electrospray coating, or gravure coating).

The current collectors are typically thin foils of conductive metals such as, for example, copper, stainless steel, or nickel foil. After the slurry is coated onto the current collector foil, it is allowed to dry followed usually by drying in a heated oven, typically set at about 80° C. to about 300° C., for about an hour to remove solvent. The negative electrode can be compressed by pressing between two plates or rollers, as known by those skilled in the art. The electrode may also be provided with a raised pattern as disclosed in U.S. Pat. Publ. No. 2008/0248386 (Obrovac et al.).

Positive electrodes can be formed in similar manner to the negative electrode, for example, from a positive electrode composition coated on an aluminum current collector. Exemplary positive electrode compositions may include a polymeric binder and lithium transition metal oxides such as $LiV_3O_8$, $LiV_2O_5$, $LiCo_{0.2}Ni_{0.8}O_2$, $LiNiO_2$, $LiFePO_4$, LiMnPO$_4$, LiCoPO$_4$, LiMn$_2$O$_4$, LiCoO$_2$; compositions that include mixed metal oxides (e.g., two or three of cobalt, manganese, and nickel).

The positive electrode and negative electrode can be combined with an electrolyte to form a lithium ion electrochemical cell. Methods of fabricating a lithium ion electrochemical cell will be well known to one of ordinary skill in the battery art. In the cell, the electrolyte is in contact with both the positive electrode composition and the negative electrode composition, and the positive electrode and the negative electrode are not in physical contact with each other; typically, they are separated by a polymeric separator film sandwiched between the electrodes. For evaluation of performance, 2325 coin cells are typically used. Their construction is further described in the Examples.

The electrolyte may be liquid, solid, or a gel. Examples of solid electrolytes include polymeric electrolytes such as polyethylene oxide, polytetrafluoroethylene, fluorine-containing copolymers, and combinations thereof. Examples of liquid electrolyte solvents include ethylene carbonate, 1-fluoroethylene carbonate, diethyl carbonate, dimethyl carbonate, ethyl methyl carbonate, vinyl carbonate, propylene carbonate, and combinations thereof. The electrolyte solvent is provided with a lithium electrolyte salt to make an electrolyte. Examples of suitable lithium electrolyte salts include LiPF$_6$, LiBF$_4$, LiClO$_4$, lithium bis(oxalato)borate, LiN(CF$_3$SO$_2$)$_2$, LiN(C$_2$F$_5$SO$_2$)$_2$, LiAsF$_6$, LiC(CF$_3$SO$_2$)$_3$, and combinations thereof.

Objects and advantages of this invention are further illustrated by the following examples, but the particular materials and amounts thereof recited in these examples, as well as other conditions and details, should not be construed to unduly limit this invention.

EXAMPLES

Preparation of Samples

Sn$_{30}$Co$_{40}$C$_{40}$, Sn$_{30}$Fe$_{50}$C$_{20}$, and Sn$_{40}$Co$_{40}$C$_{20}$ samples were alloyed mechanically by low energy roller milling (pebble mill) or by vertical-axis attritor milling (01-HD attritor, available from Union Process, Akron, Ohio). The starting materials for the Examples were CoSn$_2$, Co (Sigma-Aldrich, <150μ, 99.9+%), Fe (Alfa Aesar, spherical, <10μ, 99.5%) and graphite (Fluka, purum). The CoSn$_2$ was arc melted from elemental Sn (Sigma-Aldrich, <150μ, 99.9+%) and Co followed by annealing at 500° C. for 24 hours under flowing argon. The annealed material was then ground into powder.

A 20.5 g reactant charge was used in the vertical-axis attritor. About 1,400 ¼ (0.67 cm) diameter stainless steel balls along with the reactants were loaded into the 700 mL stainless steel attritor can. The attritor can was mounted within a water cooling jacket and maintained at about 20° C. during milling. The can was equipped with a sealed cover through which the rotating shaft projected. The shaft seal and bearings were modified in-house to provide an air-tight long-term seal. The rotating shaft had eight mixing arms that violently stirred the balls and the reactant charge. The angular velocity of the shaft was set at 700 RPM for the results described herein.

A 30.0 g reactant charge was used in the pebble mill. The outer diameter of the pebble mill chamber was 9.95 (25.3 cm), the inner diameter (diameter of the cavity containing the balls) was 6.5 (16.5 cm), and the width of the cavity was 1.6 (4.1 cm). The pebble mill chamber has two identical cylindrical halves which fit together and seal with an O-ring. About 2,215 ¼ (0.67 cm) diameter stainless steel balls along with the reactants were loaded inside of the hardened steel chamber. The angular velocity of the chamber was set at 99 RPM for the results described herein.

Powder handling and loading of both the pebble mill mixing chamber and the attritor can were performed inside of an argon-filled glove box. Separate samples with milling times of 4, 8, and 16 hours were prepared by attritor milling. Samples of Sn$_{30}$Co$_{40}$C$_{40}$, Sn$_{30}$Fe$_{50}$C$_{20}$, and Sn$_{40}$Co$_{40}$C$_{20}$ prepared by pebble milling were taken after various milling times. To do so, the chamber was opened inside of an argon-filled glove box where about 0.5 g of material was removed. The chamber was then resealed inside of the argon-filled glove box.

Preparation of Electrodes

The electrode powders were coated onto copper foils with a weight-to-weight ratio of 80% of milled powder, 12% Super-S carbon black (MMM Carbon, Belgium), and a binder consisting of an 8% solution of polyacrylic acid (available from Alfa-Aesar, Ward Hill, Mass., MW 240K) which was neutralized with LiOH.H$_2$O (Sigma Aldrich, Milwaukee, Wis.) to form a solution of lithium polyacrylate (Li-PAA). The electrodes were dried at 90° C. for four hours before use. 100 mL of electrolyte solution 1M LiPF$_6$ in 90 wt % ethylene carbonate (EC): diethylene carbonate (DEC) (1:2 v/v, available from Ferro Chemicals, Zachary, La.); 10 wt % fluoroethylene carbonate (FEC, available from Fujian Chuangxin Science and Technology Development, LTP, Fujian, China) were mixed and used as the electrolyte. Disks (13 mm diameter) were cut from the electrode coatings for use in 2325 coin cells. Each 2325 coin cell contained an 18 mm diameter disk of stainless steel for use as a spacer (34 mil (900 μm) thick), a 13 mm diameter disk of the alloy electrode, two 20 mm diameter microporous separators (CELGARD 2300, available from Separation Products, Hoechst Celanese Corporation, Charlotte, N.C.), 13 mm diameter lithium (0.38 mm thick lithium ribbon, available from Aldrich, Milwaukee, Wis.), and a stainless steel Belleville washer selected to apply 200 PSI vertical stack pressure on the assembly. The coin cells were assembled in an argon-filled glove box.

Electrochemical Testing Protocol

For all cells, the same electrochemical testing protocol was used. The theoretical capacities of the milled materials were calculated assuming that only Sn and C were active materials with 4.4 Li for every Sn atom and 0.5 Li for every C atom. After the assembly, the coin cells were discharged from open circuit (near 2.7 V) to 0.005 V. The potential was then increased to 2.5 V to be decreased again to 0.005 V. This cycling was done for a total of two cycles at a C/10 rate, as calculated prior from the expected theoretical capacity. After the first two cycles, the cells were discharged-charged from 0.005 V to 1.2 V at a C/5 rate for many cycles.

The powders from the samples made by the methods described above were studied by X-ray diffraction using a powder X-ray diffractometer equipped with a Cu-target X-ray tube and a diffracted-beam monochromator. Each X-ray scan was collected from 20 to 60 degrees in −0.05 degree increments at 10 or 30 sec/point.

Example 1

Figure 1:
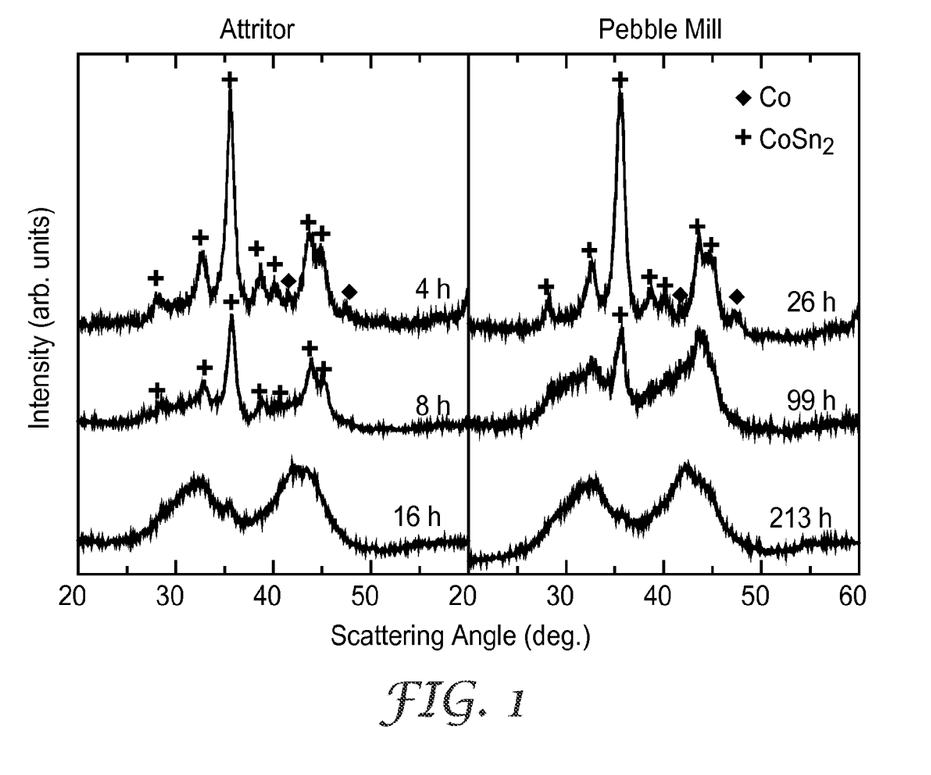
FIG. 1 is a chart of X-ray diffraction patterns (XRD) vs. milling times for $Sn_{30}Co_{40}C_{40}$ prepared by vertical-axis attritor milling and for $Sn_{30}Co_{40}C_{40}$ prepared using a pebble mill.

A material of the formula, Sn$_{30}$Co$_{30}$C$_{40}$, was prepared by pebble milling using CoSn$_2$, Co, and graphite as starting materials. After 213 hours of pebble milling the x-ray diffraction pattern of the powder was measured. The powder pattern was characteristic of an alloy consisting of an amorphous majority phase and a small amount of nanostructured $CoSn_2$ minority phase having a grain size less than about 3 nm. FIG. 1 shows the x-ray diffraction results of the powder produced in Example 1 (prepared by pebble milling) compared to the same formula that was processed by attritor milling.

Example 2

Figure 2:
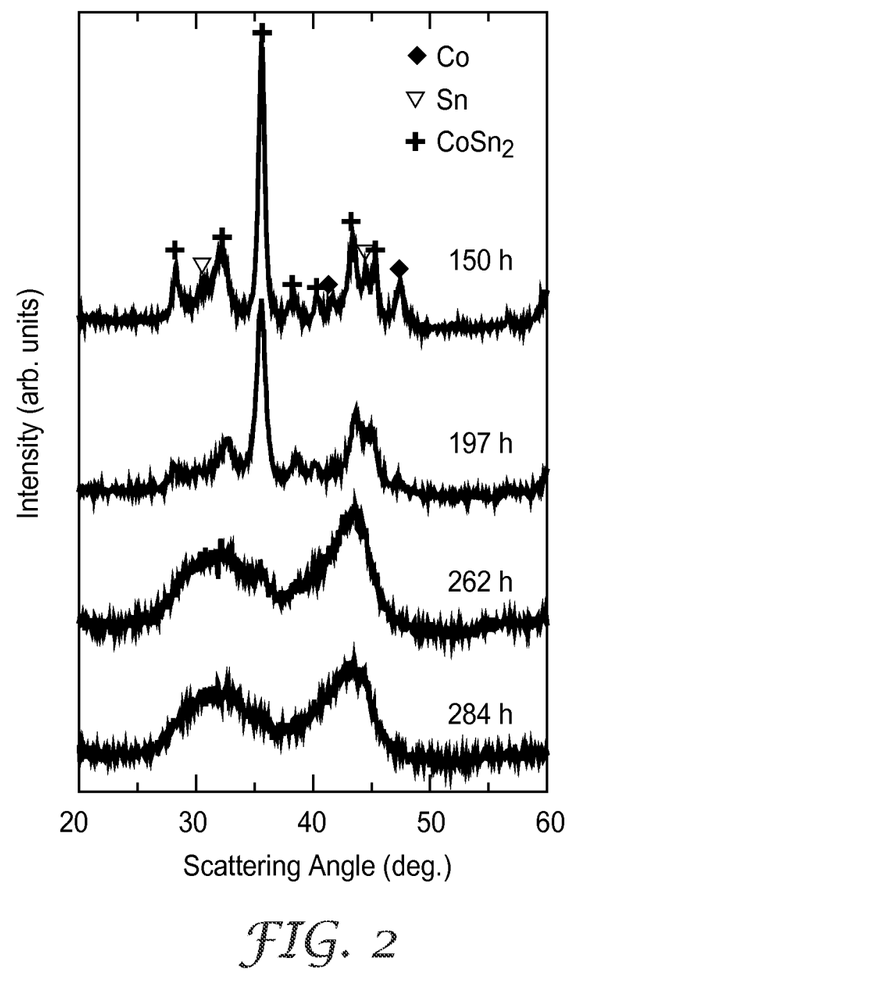
FIG. 2 displays XRD patterns vs. milling times for $Sn_{30}Co_{40}C_{40}$ prepared using a pebble mill.
Figure 3:
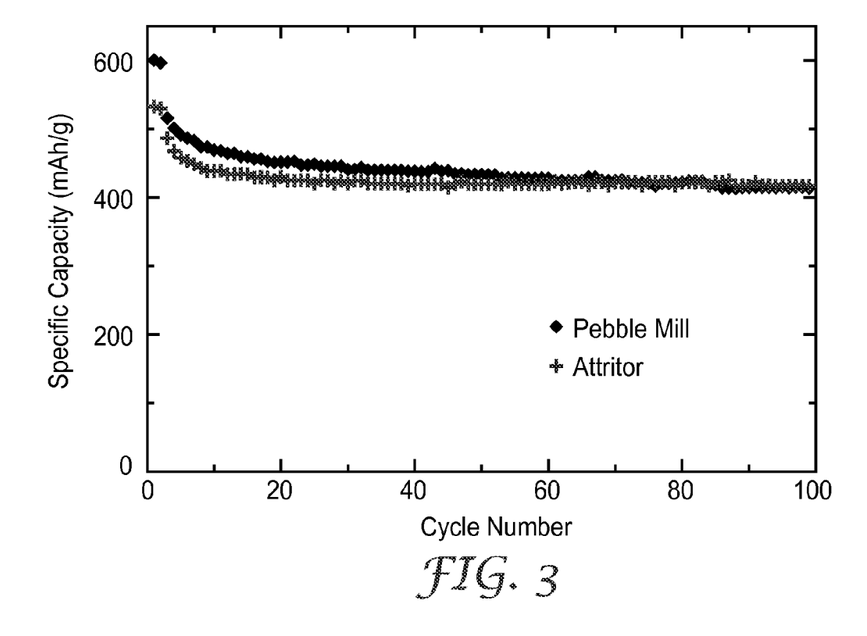
FIG. 3 is a graph of specific capacity (mAh/g) vs. cycle number for selected milled materials described in FIGS. 1 and 2.

A material of the formula, $Sn_{30}Co_{30}C_{40}$, was prepared by pebble milling using Sn, Co, and graphite as starting materials. After 284 hours of pebble milling the x-ray diffraction pattern of the powder was measured. The powder pattern was characteristic of an alloy consisting of an amorphous majority phase and a small amount of nanostructured $CoSn_2$ minority phase having a grain size less than about 3 nm. The x-ray diffraction results of this sample are shown in FIG. 2. FIG. 3 shows the specific capacity (mAh/g) vs. cycle number of $Sn_{30}Co_{30}C_{40}$ positive electrodes made from $CoSn_2$, Co, and graphite by pebble milling and attritor milling. These electrodes were incorporated into 2325 coin cells and cycled as described above.

Comparative Example 1

The preparation of a material having the formula, $Sn_{30}Co_{30}C_{40}$, was attempted by attritor milling using Sn, Co, and graphite as starting materials. Instead of forming an alloy the Sn particles segregated from the starting materials and welded together into a mass. It was concluded that a $Sn_{30}Co_{30}C_{40}$ alloy could not be made using this method.

Example 3

Figure 4:
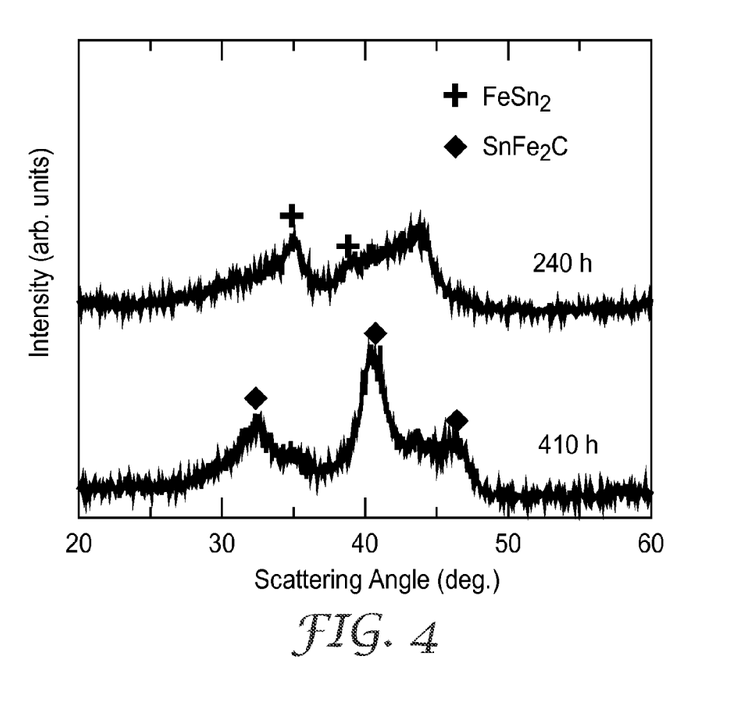
FIG. 4 displays an XRD pattern for $Sn_{30}Fe_{50}C_{20}$ prepared by using a pebble mill.
Figure 5:
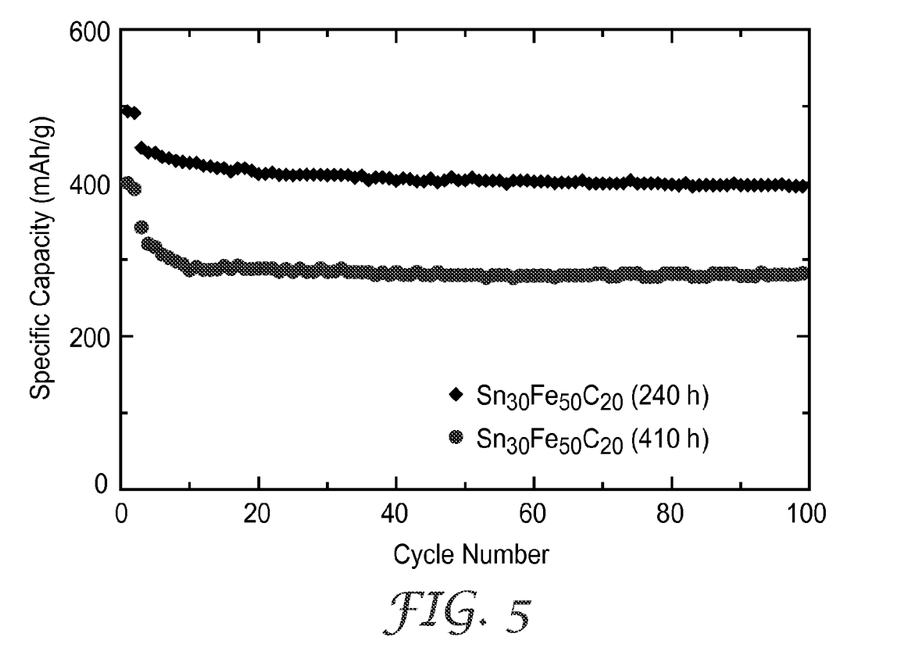
FIG. 5 is a graph of specific capacity (mAh/g) vs. cycle number for the sample of FIG. 4.

A material of the formula, $Sn_{30}Fe_{50}C_{20}$, was prepared by pebble milling using Sn, Fe, and graphite as starting materials. After 410 hours of pebble milling the x-ray diffraction pattern of the powder was measured. The powder pattern was characteristic of an alloy consisting of an amorphous phase and a nanostructured $SnFe_3C$ phase having a grain size of about 3 nm. The x-ray diffraction pattern of this material is shown in FIG. 4. FIG. 5 shows the cycling performance (specific capacity vs. cycle number) for an electrode made from the material of Example 3 and incorporated into a 2325 coin cell.

Example 4

Figure 6:
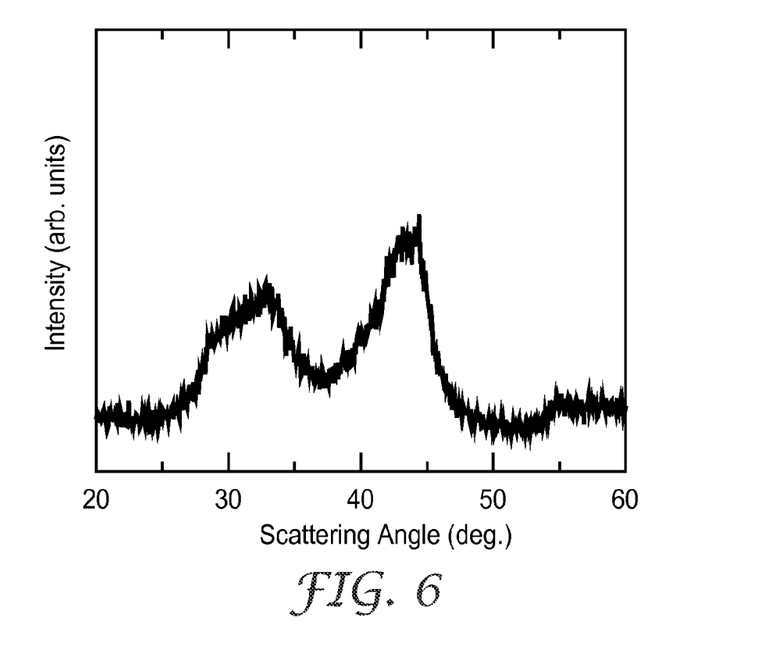
FIG. 6 displays an XRD pattern for $Sn_{40}Co_{40}C_{20}$ prepared by using a pebble mill after 200 hours of milling.
Figure 7:
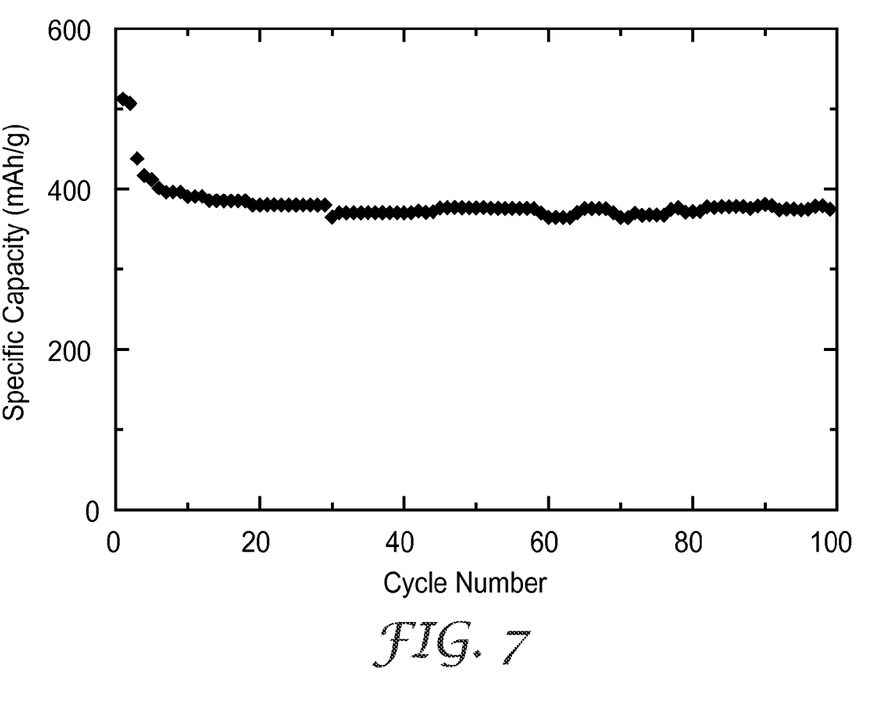
FIG. 7 is a graph of specific capacity (mAh/g) vs. cycle number for the sample of FIG. 6.

A material of the formula, $Sn_{40}Co_{40}C_{20}$, was prepared by pebble milling using $CoSn_2$, Co, and graphite as starting materials. After 213 hours of pebble milling the x-ray diffraction pattern of the powder was measured. The powder pattern was characteristic of an amorphous alloy. The x-ray diffraction pattern of this material is shown in FIG. 6. Cycling behavior (specific capacity vs. cycle number) is shown for an electrode made using the material of Example 4 and made into 2325 electrochemical cells. Table 1 shows the discharge capacity of cells made from material of Examples 1-4 after 20 discharge cycles and after 100 discharge cycles. The cycling results of Examples 1-4 are characteristic of negative electrode materials with high capacity and long cycle life. Such materials are useful in lithium-ion electrochemical cells and batteries.

TABLE 1

Cycling Performance of 2325 Coin Cells

| Electrode Material | Cycle 20 Discharge Capacity (mAh/g) | Cycle 100 Discharge Capacity (mAh/g) |
|---|---|---|
| Example 1 | 420 | 410 |
| Example 2 | 450 | 410 |
| Example 3 | 410 | 400 |
| Example 4 | 390 | 380 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A method of making nanostructured alloy particles containing substantially no silicon, the method comprising: milling a millbase in a pebble mill containing milling media to provide the nanostructured alloy particles, wherein the millbase comprises: tin, carbon, and a transition metal selected from Fe, Ti, Y, V, Cu, Zr, Zn, Co, Mn, Mo, Ni, and Misch metal, and wherein the nanostructured alloy particles are substantially free of crystalline domains greater than 50 nanometers in size.

2. A method according to claim 1, wherein the pebble mill has a theoretical critical speed, and the step of milling the millbase in a pebble mill comprises operating the pebble mill at a rotational speed in a range of from 50 to 140 percent of the theoretical critical speed.

3. A method according to claim 1, wherein the pebble mill has a theoretical critical speed, and wherein the pebble mill has a containment wall having a temperature, and wherein the temperature is maintained at or below 100° C.

4. A method according to claim 1, wherein the milling time is less than about 300 hours.

5. A method according to claim 4, wherein the milling time is less than about 100 hours.

6. A method according to claim 1, wherein the milling media comprises stainless steel.

7. A method according to claim 6, wherein the media has an average diameter of less than about 1.3 cm.

8. A method according to claim 6, wherein the media has an average diameter of less than about 0.70 cm.

9. A method according to claim 1, wherein the millbase comprises at least one of iron or cobalt.

10. A method according to claim 1, further comprising a milling aid.

11. A method according to claim 10, wherein the milling aid comprises stearic acid.

* * * * *

UNITED STATES PATENT AND TRADEMARK OFFICE
CERTIFICATE OF CORRECTION

PATENT NO.        : 8,586,240 B2                                  Page 1 of 1
APPLICATION NO.   : 13/560402
DATED             : November 19, 2013
INVENTOR(S)       : Jeffrey R. Dahn et al.

It is certified that error appears in the above-identified patent and that said Letters Patent is hereby corrected as shown below:

In the Specification

Column 1
Line 9, delete "20," and insert -- 29, --, therefor.

Column 5
Line 45, delete "milling" and insert -- Milling --, therefor.

Signed and Sealed this
Sixteenth Day of September, 2014

Michelle K. Lee
*Deputy Director of the United States Patent and Trademark Office*